United States Patent
Ganapathy

(10) Patent No.: US 11,943,361 B2
(45) Date of Patent: Mar. 26, 2024

(54) METHOD FOR SEAMLESSLY RECOVERING A SINGLE SIGN-ON PASSWORD IN WI-FI MULTI-ACCESS POINT DEVICE NETWORK

(71) Applicant: ARRIS Enterprises LLC, Suwanee, GA (US)

(72) Inventor: Jalagandeswari Ganapathy, Bangalore (IN)

(73) Assignee: ARRIS ENTERPRISES LLC, Horsham, PA (US)

( * ) Notice: Subject to any disclaimer, the term of this patent is extended or adjusted under 35 U.S.C. 154(b) by 378 days.

(21) Appl. No.: 17/476,682

(22) Filed: Sep. 16, 2021

(65) Prior Publication Data

US 2022/0158837 A1    May 19, 2022

Related U.S. Application Data

(60) Provisional application No. 63/115,841, filed on Nov. 19, 2020.

(51) Int. Cl.
*H04L 9/32* (2006.01)
*H04L 9/40* (2022.01)
*H04W 84/12* (2009.01)

(52) U.S. Cl.
CPC ........ *H04L 9/3226* (2013.01); *H04L 63/0815* (2013.01); *H04W 84/12* (2013.01)

(58) Field of Classification Search
None
See application file for complete search history.

(56) References Cited

U.S. PATENT DOCUMENTS

2006/0069916 A1* 3/2006 Jenisch ............... H04L 63/0846
                                                          713/172
2021/0216620 A1    7/2021 Ganapathy et al.

FOREIGN PATENT DOCUMENTS

| CN | 106656547 | 5/2017 |
| CN | 107613492 | 1/2018 |
| EP | 2 940 961 | 4/2020 |

OTHER PUBLICATIONS

International Search Report and Written Opinion of the International Searching Authority dated Dec. 20, 2021 in International (PCT) Application No. PCT/US2021/050606.
International Preliminary Report on Patentability and Written Opinion dated Jun. 1, 2023 in International Application No. PCT/US2021/050606.

* cited by examiner

*Primary Examiner* — William J. Goodchild
(74) *Attorney, Agent, or Firm* — Wenderoth, Lind & Ponack, L.L.P.

(57) ABSTRACT

A client device for use with a gateway device (or a Wi-Fi APD) with a key stored therein and an external server where an original singe sign on (SSO) password is stored. The client device transmits a one time password (OTP) request to the external server, obtains the OTP from the external server, transmits the OTP to the external server to authenticate the client device, transmits an encrypted SSO password request to the external server, onboards the gateway device using a temporary password, receives the encrypted SSO password from the external server, obtains the key from the gateway device, decrypts the encrypted SSO password using the key to obtain the SSO password, and changes the temporary password of the gateway device to the original SSO password.

12 Claims, 12 Drawing Sheets

METHOD FOR SEAMLESSLY RECOVERING A SINGLE SIGN-ON PASSWORD IN WI-FI MULTI-ACCESS POINT DEVICE NETWORK

BACKGROUND

Embodiments of the present disclosure relate to managing a Single Sign-On (SSO) password in a Wi-Fi multi-access point device network.

SUMMARY

Aspects of the present disclosure are drawn to a client device for use with a Wi-Fi access point device (APD) and an external server, the Wi-Fi APD having a key stored therein, the external server having an encrypted SSO password associated with the Wi-Fi APD and with the client device stored therein. The client device contains a memory and a processor configured to execute instructions stored on the memory to cause the client device to: transmit a one-time passcode (OTP) request to the external server; obtain the OTP from the external server; transmit the OTP to the external server for client authentication; transmit an encrypted SSO password request to the external server; onboard the Wi-Fi APD using a temporary password; receive the encrypted SSO password from the external server; obtain the key from the Wi-Fi APD; decrypt the encrypted SSO password using the key to obtain the SSO password; and change the temporary password of the Wi-Fi APD to the SSO password.

In some embodiments, the processor is configured to execute instructions stored on the memory to additionally cause the client device to instruct the Wi-Fi APD to perform a factory reset.

In some embodiments, the client device contains a key that based on unique information associated with the Wi-Fi ADP.

In some embodiments, the unique information used for the key stored in the client device includes a serial number of the Wi-Fi ADP.

Other aspects of the present disclosure are drawn to a method of using a client device with a Wi-Fi APD and an external server, the Wi-Fi APD having a key stored therein, the external server having an encrypted SSO password associated with the Wi-Fi APD and client device stored therein. The method includes: transmitting, via a processor configured to execute instructions stored on a memory, a OTP request to the external server; obtaining, via the processor, the OTP from the external server; transmitting, via the processor, the OTP to the external server to authenticate the client device; transmitting, via the processor, an SSO password request to the external server; receiving, via the processor, the encrypted SSO password from the external server; onboarding, via the processor, the Wi-Fi APD using a temporary password; obtaining, via the processor, the key from the Wi-Fi APD; decrypting, via the processor, the encrypted SSO password using the key to obtain the SSO password; and changing, via the processor, the temporary password of the Wi-Fi APD to the SSO password.

In some embodiments, the method further includes instructing, via the processor, the Wi-Fi APD to perform a factory reset.

In some embodiments, the method further includes the key which is based on unique information associated with the Wi-Fi APD.

In some embodiments, the method further includes unique information which includes a serial number of the Wi-Fi APD.

Other aspects of the present disclosure are drawn to non-transitory, computer-readable media having computer-readable instructions stored thereon, the computer-readable instructions being capable of being read by a client device for use with a Wi-Fi APD and an external server, the Wi-Fi APD having a key stored therein, the external server having an encrypted SSO password associated with the Wi-Fi APD and with the client device stored therein, wherein the computer-readable instructions are capable of instructing the client device to perform the method including: transmitting, via a processor configured to execute instructions stored on a memory, a OTP request to the external server; obtaining, via the processor, the OTP from the external server; transmitting, via the processor, the OTP to the external server to authenticate the client device; transmitting, via the processor, an SSO password request to the external server; receiving, via the processor, the encrypted SSO password from the external server; onboarding, via the processor, the Wi-Fi APD using a temporary password; obtaining, via the processor, the key from the Wi-Fi APD; decrypting, via the processor, the encrypted SSO password using the key to obtain the SSO password; and changing, via the processor, the temporary password of the Wi-Fi APD to the SSO password.

In some embodiments, the computer-readable instructions are capable of instructing the client device to perform the method further including instructing, via the processor, the Wi-Fi APD to perform a factory reset.

In some embodiments, the computer-readable instructions are capable of instructing the client device to perform the method wherein the key is based on unique information associated with the Wi-Fi APD.

In some embodiments, the computer-readable instructions are capable of instructing the client device to perform the method wherein the unique information includes a serial number of the Wi-Fi APD.

BRIEF SUMMARY OF THE DRAWINGS

The accompanying drawings, which are incorporated in and form a part of the specification, illustrate example embodiments and, together with the description, serve to explain the principles of the present disclosure. In the drawings.

DETAILED DESCRIPTION

The following detailed description is made with reference to the accompanying drawings and is provided to assist in a comprehensive understanding of various example embodiments of the present disclosure. The following description includes various details to assist in that understanding, but these are to be regarded merely as examples and not for the purpose of limiting the present disclosure as defined by the appended claims and their equivalents. The words and phrases used in the following description are merely used to enable a clear and consistent understanding of the present disclosure. In addition, descriptions of well-known structures, functions, and configurations may have been omitted for clarity and conciseness. Those of ordinary skill in the art will recognize that various changes and modifications of the examples described herein can be made without departing from the spirit and scope of the present disclosure.

Figure 1A:
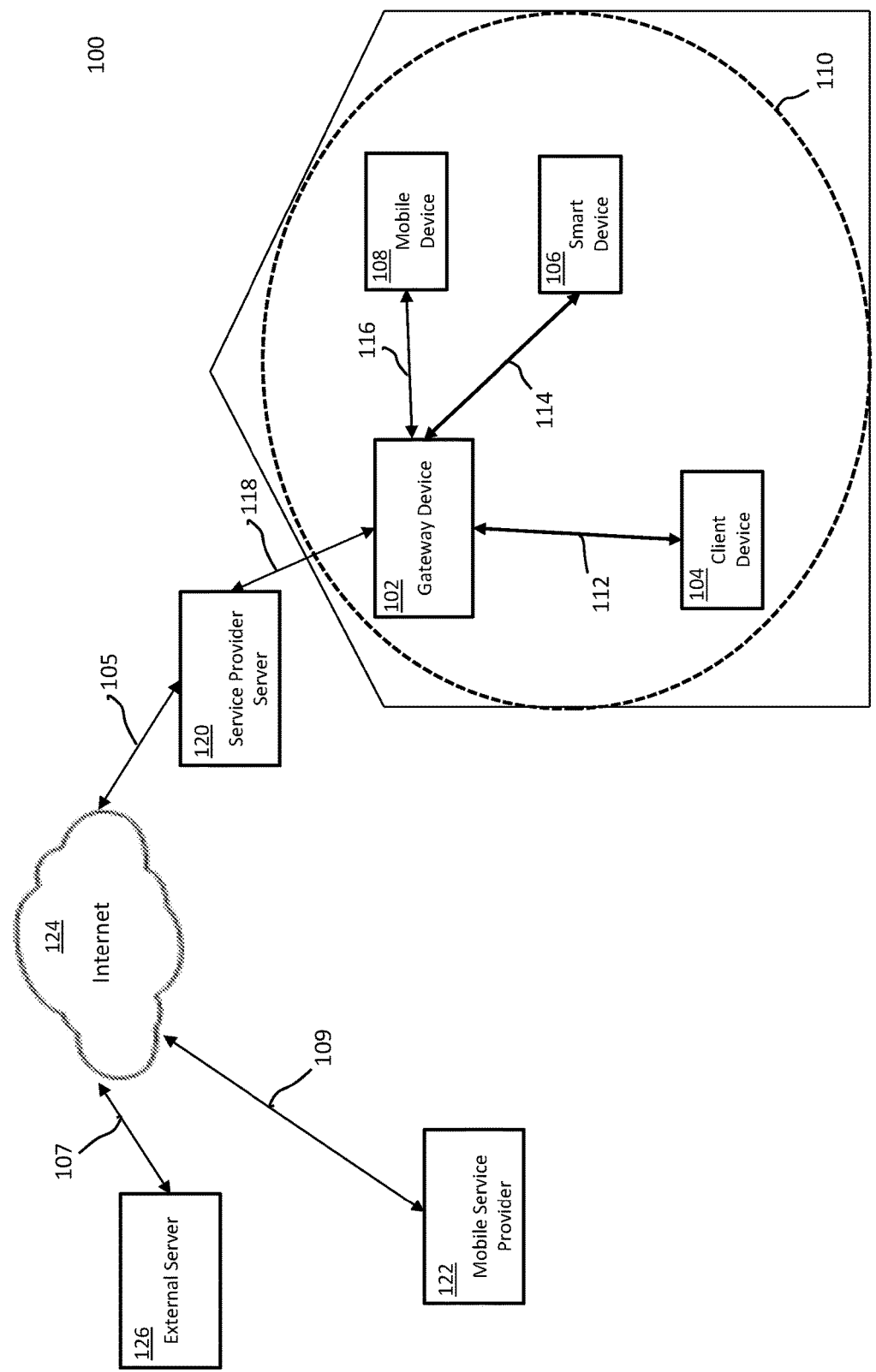
FIG. 1A illustrates structural components implementing a secure electronic communication network at a time $t_0$.

FIG. 1A illustrates structural components implementing a communication system 100 at time $t_0$.

As shown in the figure, communication system 100 includes: a gateway device 102, a client device 104, a smart media device 106, a mobile device 108, a secure Wi-Fi network 110, a service provider server 120, an Internet 124, a mobile service provider 122, and an external server 126. Client device 104 is configured to communicate with gateway device 102 via secure communication channel 112. Smart media device 106 is configured to communicate with gateway device 102 via secure communication channel 114. Mobile device 108 is configured to communicate with gateway device 102 via secure communication channel 116. Gateway device 102 is configured to communicate with service provider server 120 via physical media/wiring 118. Service provider server 120 is configured to communicate with Internet 124 via secure communication channel 105. Mobile service provider 122 is configured to communicate with Internet 124 via secure communication channel 109. Lastly, external server 126 is configured to communicate with Internet 124 via secure communication channel 107.

Gateway device 102, also referred to as a Wi-Fi APD, residential gateway, or RG, is an electronic device that is to be located so as to establish a local area network (LAN) at a user premises. The user premises may include a residential dwelling, office, or any other business space of a user. The terms home, office, and premises may be used synonymously herein.

Gateway device 102 may be any device or system that is operable to allow data to flow from one discrete network to another, which as will be described in greater detail below, will be from a wireless local area network (WLAN) to an external network, e.g., the Internet, which is shown as Internet 124. Gateway device 102 may perform such functions as web acceleration and HTTP compression, flow control, encryption, redundancy switchovers, traffic restriction policy enforcement, data compression, TCP performance enhancements (e.g., TCP performance enhancing proxies such as TCP spoofing), quality of service functions (e.g., classification, prioritization, differentiation, random early detection (RED), TCP/UDP flow control), bandwidth usage policing, dynamic load balancing, and routing.

As will be described in greater detail below, gateway device 102 establishes, or is part of WLAN 110, using Wi-Fi for example, such that client device 104, smart media device 106, and mobile device 108 are able to communicate wirelessly with gateway device 102. The term Wi-Fi as used herein may be considered to refer to any of Wi-Fi 4, 5, 6, 6E, or any variation thereof.

Further, it should be noted that gateway device 102 is able to communicate with service provider server 120 via physical media/wiring 118, which may optionally be a wireless communication system, such as 4G, or 5G and further is able to connect to Internet 124 via service provider server 120. Service provider server 120 is configured to connect gateway device 102 to external server 126 by way of secure communication channel 107, Internet 124, and secure communication channel 105. Service provider server 120 is also configured to connect gateway device 102 to mobile service provider 122 via secure communication channel 109, Internet 124, and secure communication channel 105.

Gateway device 102 serves as a gateway or access point to Internet 124 for one or more electronic devices, referred to generally herein as client device 104, smart media device 106, and mobile device 108 that wirelessly communicate with gateway device 102 via, e.g., Wi-Fi. Client device 104, smart media device 106, and mobile device 108 can be desk top computers, laptop computers, electronic tablet devices, smart phones, appliances, or any other so called internet of things (IoT) equipped devices that are equipped to communicate information via Wi-Fi network 110.

Within Wi-Fi network 110, electronic devices are often referred to as being stations in Wi-Fi network 110. In IEEE 802.11 (Wi-Fi) terminology, a station (abbreviated as STA) is a device that has the capability to use the 802.11 protocol. For example, a station may be a laptop, a desktop PC, PDA, APD, or Wi-Fi phone. An STA may be fixed, mobile or portable. Generally, in wireless networking terminology, a station, wireless client, and node are often used interchangeably, with no strict distinction existing between these terms. A station may also be referred to as a transmitter or receiver based on its transmission characteristics. IEEE 802.11-2012 defines station as: a logical entity that is a singly addressable instance of a medium access control (MAC) and physical layer (PHY) interface to the wireless medium (WM).

A wireless access point (WAP), or more generally just access point (AP), is a networking hardware device that allows other Wi-Fi devices to connect to a Wi-Fi network. A service set ID (SSID) is an identification (in IEEE 802.11) that is broadcast by access points in beacon packets to announce the presence of a network access point for the SSID. SSIDs are customizable IDs that can be zero to 32 bytes, and can be in a natural language, such as English. In Wi-Fi network 110, gateway device 102 is an access point for Wi-Fi network 110.

External server 126 may store all secure information that was created during the initial setup of secure Wi-Fi network 110. The secure information includes the encrypted SSO password and the keys that were configured for all smart media devices inside secure Wi-Fi network 110 to use in order to access gateway device 102 to perform various tasks like monitoring network health, creating a new user account, configuring access level for certain devices in the network, etc.

The scenario illustrated in FIG. 1A represents a secure communication network that has already been established where the encrypted SSO password and keys are stored remotely on external server 126. The encrypted SSO password stored on external server 126 is mainly used by all client devices in Wi-Fi network 110 to access and control gateway device 102. The encrypted keys stored on external server 126 are used by client devices in Wi-Fi network 110 to decrypt the encrypted SSO password in order to gain access to gateway device 102. The functionalities of both the encrypted SSO password and the keys will be explained in further details below.

A user of client device 104 may create an account that is managed by external server 126. Client device 104 may create the account for managing gateway device 102. This method of account creation would require the user to remember both the username and password every time they access the account by way of client device 104. Some conventional systems provide a password-hidden login and recovery mechanism such that the user only needs to remember the username to log into the account by way of client device 104.

Client device 104 may be used to manage the features provided by gateway device 102. Further, a Single Sign On password (SSO password) methodology may be used for managing user accounts across various other cloud system components. Hence it is important to make sure that the SSO password is synchronized across these various other cloud system components for a seamless user experience with client device 104.

In some cases, for the above methodology to work, client device 104 may utilize several unique, secure techniques to support a SSO password, wherein the user would be required to enter both username and password. With this process, the user would be burdened with remembering and entering both the username and the SSO password each time to access their user account as stored in external server 126. This burden may be lightened with the use of a hidden SSO password.

The use of a hidden SSO password first involves client device 104 automatically generating a SSO password upon account creation. This auto-generated SSO password is stored in the secure keychain memory portion of client device 104. This same keychain-stored, auto-generated SSO password is then used for account sign in when the user logs into the account by way of client device 104.

A client device may be authenticated by sending a one-time passcode to the email that is associated with the user of client device 104. The auto-generated SSO password is encrypted using a network device specific random key. This encrypted network device specific random key is unique for each network device. The encrypted SSO password is then stored in external server 126 during an onboarding process performed by client device 104, such as when gateway device 102 is onboarded. The same SSO password is also shared to various network devices, such as smart media device 106, during the onboarding process of gateway device 102.

The user of client device 104 may view the SSO password via client device 104 after successful authentication. External server 126 may validate a request by smart media device 106 to access the health and the network status of gateway device 102 based on the SSO password and user name as provided by smart media device 106.

Further, client device 104 may encrypt the SSO password with an encryption key. In some cases, the encryption key may be generated using unique identifiers from both gateway device 102 and client device 104. For example, the encryption key may be derived using a serial number of gateway device 102, a phone number of client device 104, and a time stamp. Client device 104 may then store the encrypted SSO password in external server 126. In the event that client device 104 loses the SSO password, e.g., instructions on client device 104 that enable client device 104 to interact with gateway device 102 are un-installed and re-installed, client device 104 may request the encrypted SSO password from external server 126. Then, client device 104 may obtain the encryption key from gateway device 102 to decrypt the encrypted SSO password in order to obtain the SSO password for use with gateway device 102.

However, there are two scenarios when the network device specific random key is not accessible and thus the SSO password is not recoverable by client device 104. The first scenario is when the instructions on client device 104 are uninstalled and then reinstalled after factory resetting gateway device 102. The second scenario is when the instructions on client device 104 are installed on another client device after factory resetting gateway device 102.

Factory resetting gateway device 102 requires the user of client device 104 to re-onboard gateway device 102 and re-register gateway device 102 with the corresponding user account in external server 126. In this situation, client device 104 will reset the password to a new password. Resetting the SSO password to a new password will be helpful only in synchronizing client device 104 when re-registering (programmatically) client device 104 with external server 126 during onboarding. However, smart media device 106 will not have the new password in this situation. Hence the services provided by smart media device 106 will stop working due to the failure of authenticating smart media device 106 with external server 126.

In order for smart media device 106 to reconnect with external server 126, the user of client device 104 will need to manually change the SSO password used by smart media device 106. Unfortunately, in many cases, the user may not realize that client device 104 had changed the SSO password, as the entire password generation and authentication process is hidden from the user. Therefore, services provided by smart media device 106 would no longer work for reasons unknown to the user. This would lead to a very frustrated user likely calling customer support to rectify the poor service provided by gateway device 102.

The problematic situation described above will be further discussed with reference to FIGS. 1B-D.

Figure 1B:
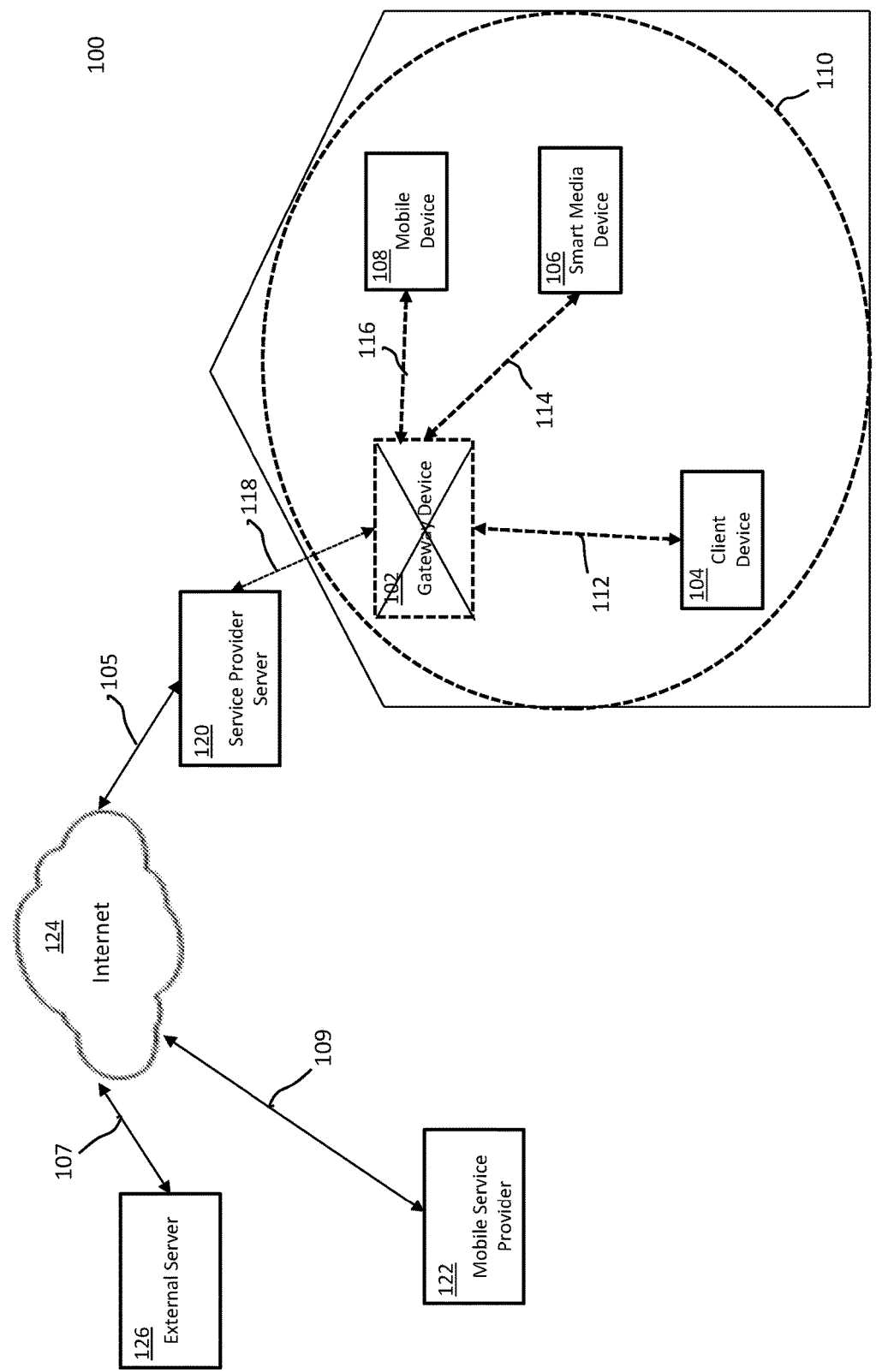
FIG. 1B illustrates the secure electronic communication network of FIG. 1A at a time $t_1$.

FIG. 1B illustrates the secure electronic communication network of FIG. 1A at time $t_1$.

As shown in FIG. 1B, at time $t_1$, gateway device 102 has recently been upgraded with new firmware and all existing configurations, including the secure information, were wiped out during the process. This causes secure Wi-Fi network 110 to go down where all devices inside Wi-Fi network 110 can no longer communicate to one another and are also unable to communicate to anything outside of Wi-Fi network 110 including: service provider server 120, Internet 124, external server 126, and mobile service provider 122. Since gateway device 102 lost all the secure information after the firmware upgrade, it cannot connect to external server 126 to retrieve the secure information. In order to reestablish all connections, gateway device 102 has to be manually reconfigured and onboarded again. This process will be further discussed with reference to FIG. 1C.

Figure 1C:
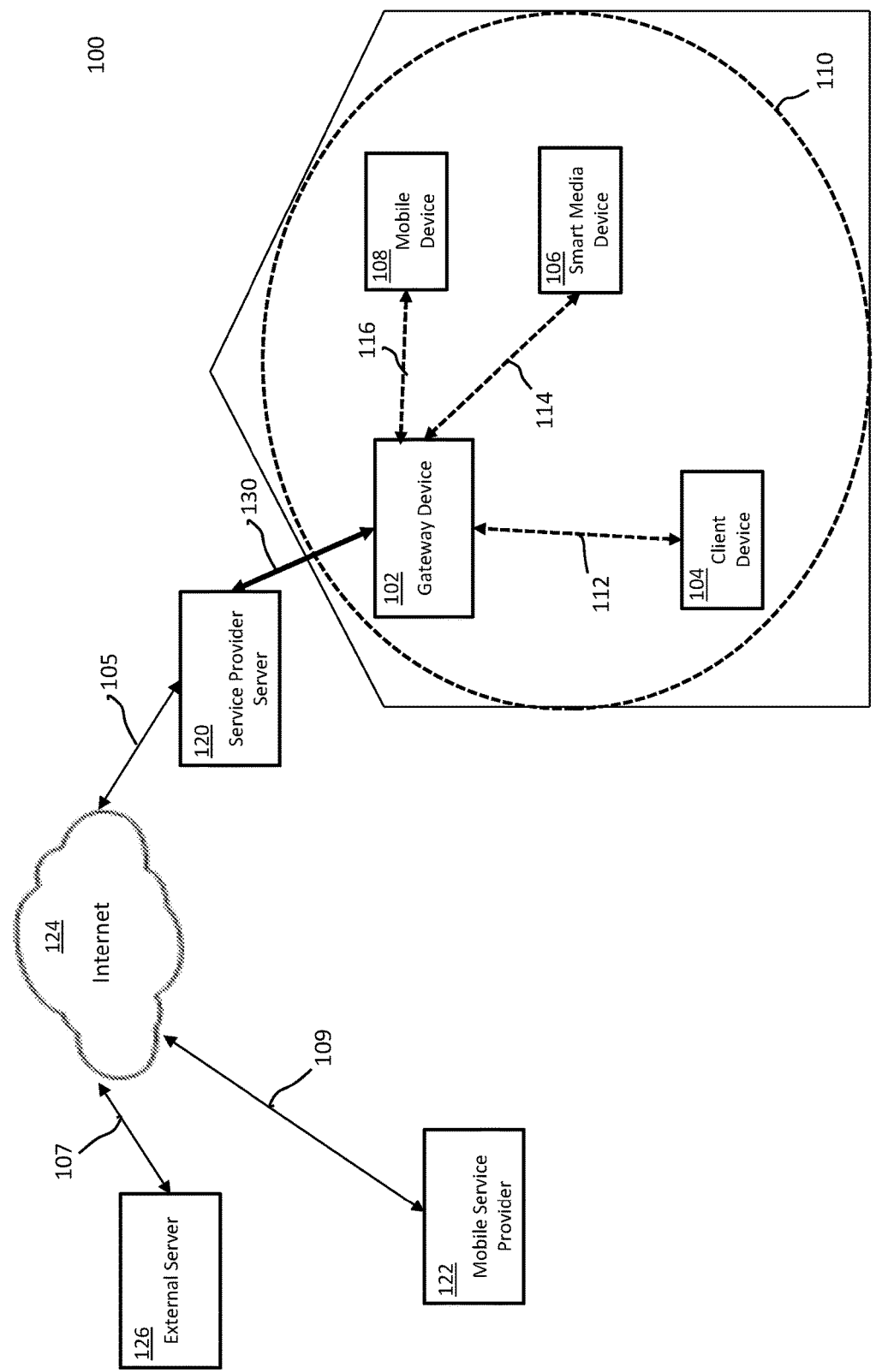
FIG. 1C illustrates the secure electronic communication network of FIG. 1A at a time $t_2$.

FIG. 1C illustrates the secure electronic communication network of FIG. 1A at time $t_2$.

As shown in FIG. 1C, at time t₂, gateway device 102 has recently finished onboarding to service provider server 120 and is connected to it via secure communication channel 130. Gateway device 102 is now able to connect to Internet 124 via service provider server 120. Gateway device 102 is also able to connect to external server 126 via service provider server 120 and Internet 124. Additionally, gateway device 102 is also able to connect to mobile service provider 122 via service provider server 120 and Internet 124. Gateway device 102 also created an open Wi-Fi SSID and started broadcasting internally for all devices in Wi-Fi network 110 to start onboarding. Note that this open Wi-Fi SSID is not the same as the original Wi-Fi SSID, so all devices in Wi-Fi network 110 have to go through the process of onboarding again. This process will be further discussed with reference to FIG. 1D.

Figure 1D:
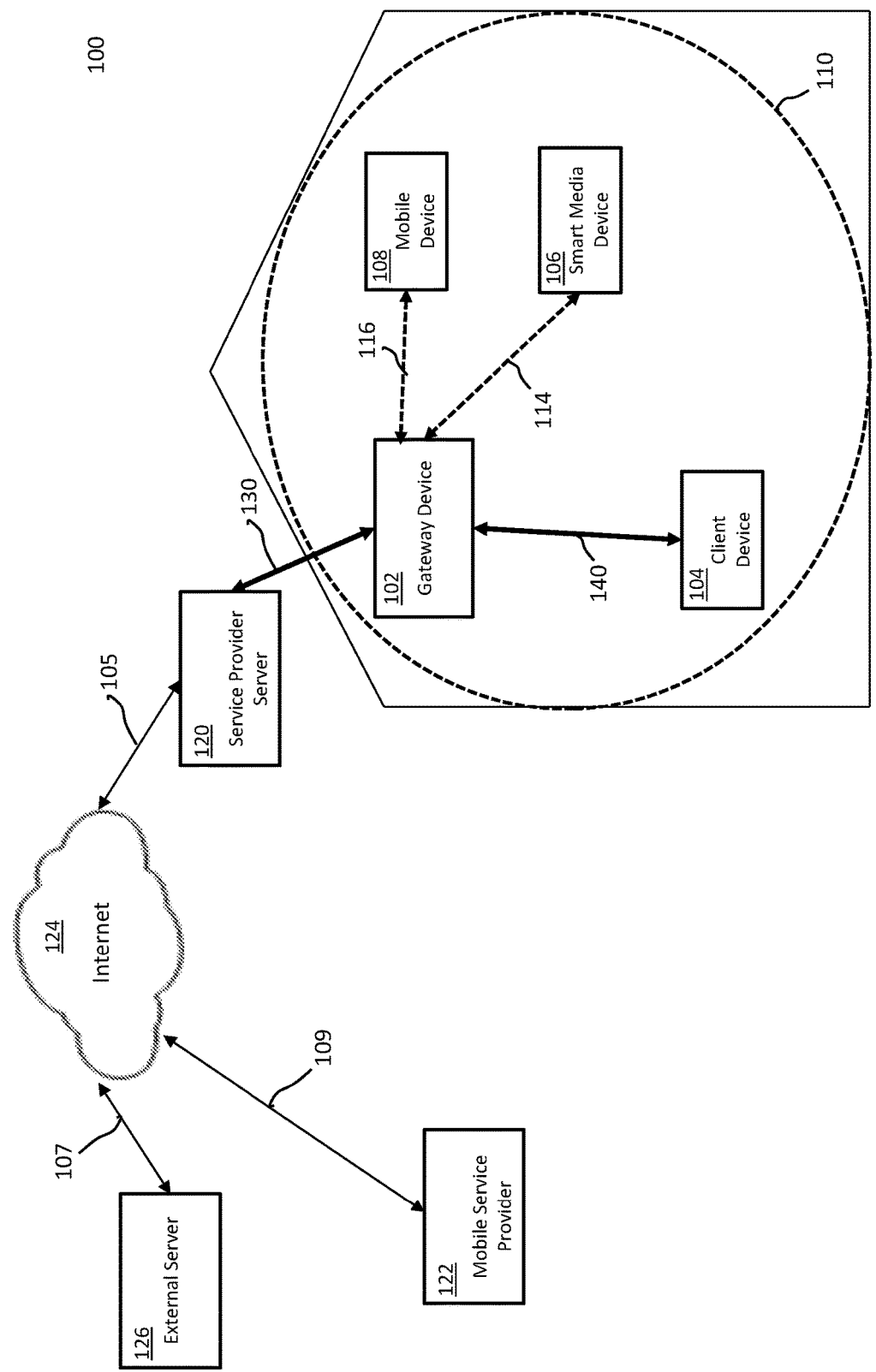
FIG. 1D illustrates the secure electronic communication network of FIG. 1A at a time $t_3$.

FIG. 1D illustrates the secure electronic communication network of FIG. 1A at time t₃;

As shown in FIG. 1D, at time t₃, client device 104 just finished onboarding to Wi-Fi network 110 using the new Wi-Fi SSID that gateway device 102 broadcasted for all clients to onboard to the network. Client device 104 is now able to connect to Internet 124 via gateway device 102 and service provider server 120. Client device 104 is also able to connect to external server 126 via gateway device 102, service provider server 120, and Internet 124.

However, as client device 104 onboards to Wi-Fi network 110, it automatically generates a new set of keys and an SSO password. This new set of keys and SSO password will not be the same as the previous set of keys and SSO password, which were stored on external server 126 prior to gateway device 102 being reset. This new SSO password has now replaced the original SSO password stored on external server 126.

Similar to client device 104, smart media device 106 onboards to Wi-Fi network 110 and is now able to connect to Internet 124 via gateway device 102. However, when the user tries to use smart media device 106 to control gateway device 102, it does not work. This is due to smart media device 106 failing to authenticate itself with gateway device 102 using the original SSO password.

The scenario presented in FIGS. 1B-D points out a limitation of storing an SSO password on an external server for a fast onboarding of clients in a Wi-Fi network where the gateway device plays a central role. If anything happens to the gateway device that causes it to lose all configurations and secure information and the main client device for re-onboarding the gateway device reinstalls the instructions for onboarding the gateway device, then the whole process of onboarding using the SSO password stored on the external server no longer works since not all clients will be able to start their services after the gateway device is rebooted and reconfigured.

What is needed is a system and method for using a client device to restore the original SSO stored on an external server to a gateway device if anything happens to the gateway device that causes it to wipe out the original SSO password.

A system and method in accordance with the present disclosure is provided for restoring the SSO password stored on an external server to a gateway device once the gateway device has successfully recovered from any major issues that caused it to completely wipe out the original configuration, including the original SSO password. This will help all client devices in the network to recover seamlessly and continue to function and provide services normally.

In accordance with the present disclosure, a system and method is provided to use a client device to restore the original SSO stored on an external server associated with a gateway device in cases where the gateway device has wiped out all of its original configuration information, including all secure information for the Wi-Fi network. The client device must connect to the gateway device locally to provide instructions for the gateway device to perform the onboarding process.

Aspects of the present disclosure propose a solution to restore the SSO password for the two scenarios discussed above in which the network device specific random key is not accessible and thus the SSO password is not recoverable by client device 104. In accordance with aspects of the present disclosure, a client device uses the following procedures for recovering the original SSO password: first, the client device stores the encrypted SSO password in an external server during the initial account creation process; second, if the client device needs to obtain the encrypted SSO password from the external server, e.g. the client device reinstalls the instructions for onboarding the gateway device, then the external server will authenticate the client device by providing a one-time passcode (OTP) to the client device; third, the client device resets the password of the user account in an external server to a temporary password; fourth, the client device proceeds with a re-onboarding process by wirelessly connecting to the network device, e.g., a gateway device; fifth, the client device retrieves the original encrypted SSO password from the external server; sixth, the client device wirelessly retrieves a device specific random key stored in the network device to be re-onboarded; seventh, the client device decrypts the encrypted SSO password using a device specific key and resets the temporary password of the user account back to the original value of the SSO password; eighth, the client device re-registers the network device to the external server by using the original SSO password; and ninth, the client device re-registers with any other external servers that may be used by the smart media device by using the original SSO password.

At this point, all components of the network, e.g., the client device and the smart media device, are using the same SSO password to interact with the gateway device. Therefore, the user will be able to use all services provided by the smart media device seamlessly.

Further, it should be noted that the nine procedures discussed above are performed by the client device without the user's knowledge, wherein the client device only needs the OTP in order to authenticate the user's email identification.

An example system and method for using a client device to restore the SSO stored on an external server associated with a gateway device in the case where the gateway device has wiped out its entire original configuration including all secure information for the Wi-Fi network will now be described in greater detail with reference to FIGS. 2-4.

Figure 2:
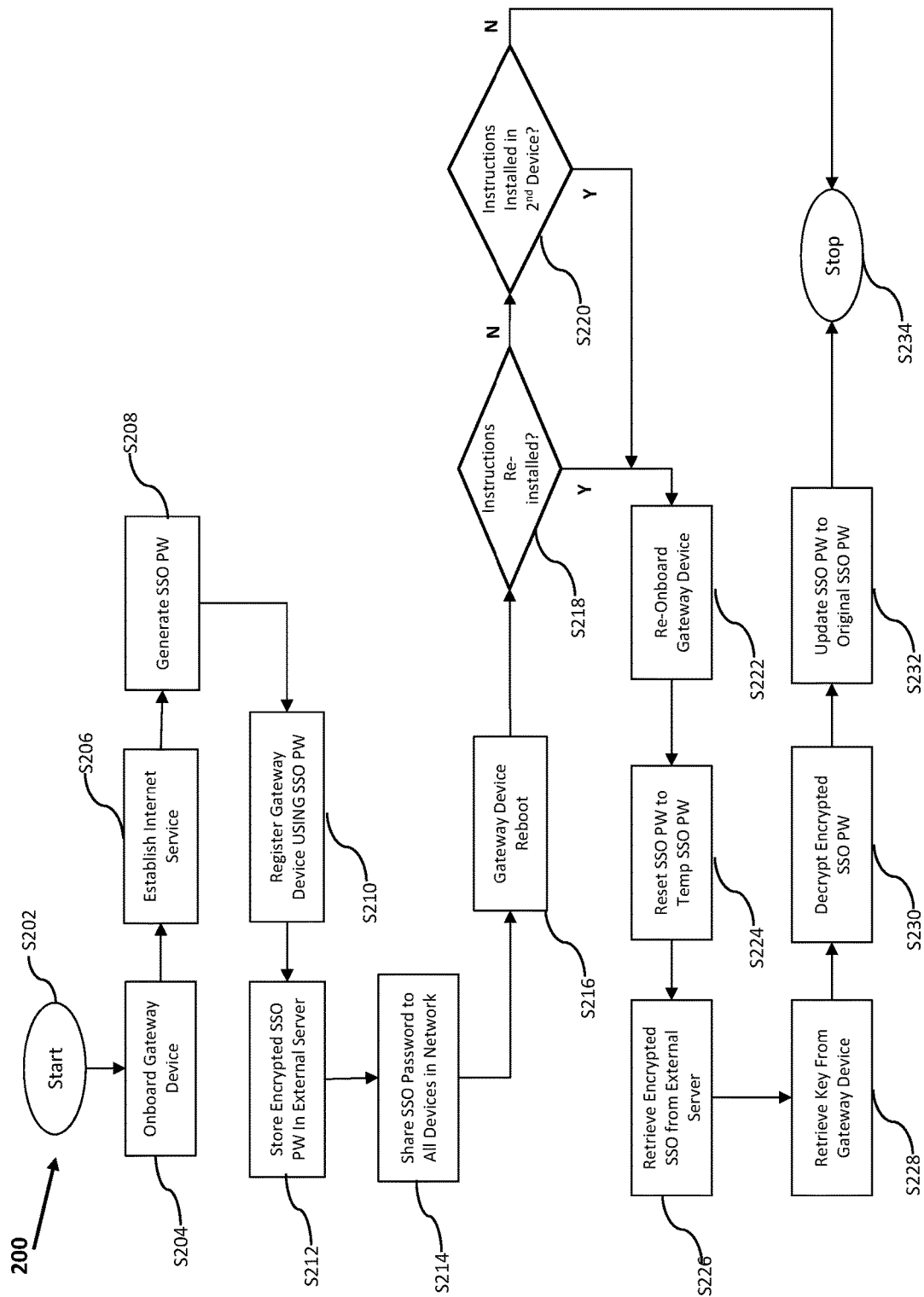
FIG. 2 illustrates an example method for seamlessly recovering the SSO password stored in a Wi-Fi communication network, in accordance with aspects of the current disclosure.

FIG. 2 illustrates an example method for seamlessly recovering the SSO password stored in a Wi-Fi communication network, in accordance with aspects of the current disclosure.

As shown in FIG. 2, method 200 starts (S202), and the network is in an initial state where the user is onboarding the gateway device (S204). This is a standard process where the gateway device establishes connection to the service provider.

Returning to FIG. 2, once the gateway device is onboarded (S204), it establishes connection to the service provider and, in turn, establishes Internet service for the Wi-Fi network (S206). For example, as shown in FIG. 1A, once gateway device 102 is onboarded, it connects to service provider server 120 and also establishes Internet services to Wi-Fi network 110.

Returning to FIG. 2, once the Internet service is established (S206), the user generates a SSO password (S208). For example, returning to FIG. 1A, the user of client device 104 uses a combination of unique keys from gateway device 102 to generate a SSO password.

Returning to FIG. 2, after the user generates a SSO password (S208), the user then uses this new SSO password to register the gateway device to the external server (S210). For example, returning to FIG. 1A, the user registers gateway device 102 to external server 126 via service provider server 120 and Internet 124.

Returning to FIG. 2, once the gateway device is registered using the SSO password (S210), this SSO password also gets encrypted using an encryption key then stores it on an external server to be used for all devices inside the Wi-Fi network (S212). For example, returning to FIG. 1A, after the user has finished registering gateway device 102, the user of client device 104 then encrypts the SSO password using an encryption key. This encryption key may be derived using a serial number of gateway device 102, a phone number of client device 104, and a time stamp. Then the SSO password and the encryption key get stored on external server 126.

Returning to FIG. 2, once the SSO password and encryption key have been stored on the external server (S212), the user then shares the SSO password with all devices in the network (S214). This SSO password will be used by all devices in the network to connect to the external server to enable access to the gateway device for controlling and monitoring the network. For example, referring to FIG. 1A, after the SSO password has been shared to smart media device 106, when a user uses smart media device 106 to request a network health check, smart media device 106 then connects to external server 126 by way of gateway device 102, service provider server 120, and Internet 124. Smart media device 106 uses the shared SSO password to authenticate with external server 126. After the authentication completes, smart media device 106 can access a network health check from gateway device 102.

Returning to FIG. 2, after sharing the SSO password with all devices in the network (S214), all devices in the network perform normally. However, after some time, the gateway device gets rebooted (S216). This could be the result of the gateway device recently updating its firmware and losing its entire original configuration including the secure information for the Wi-Fi network. This will be further described with additional references to FIGS. 3A-F.

Figure 3A:
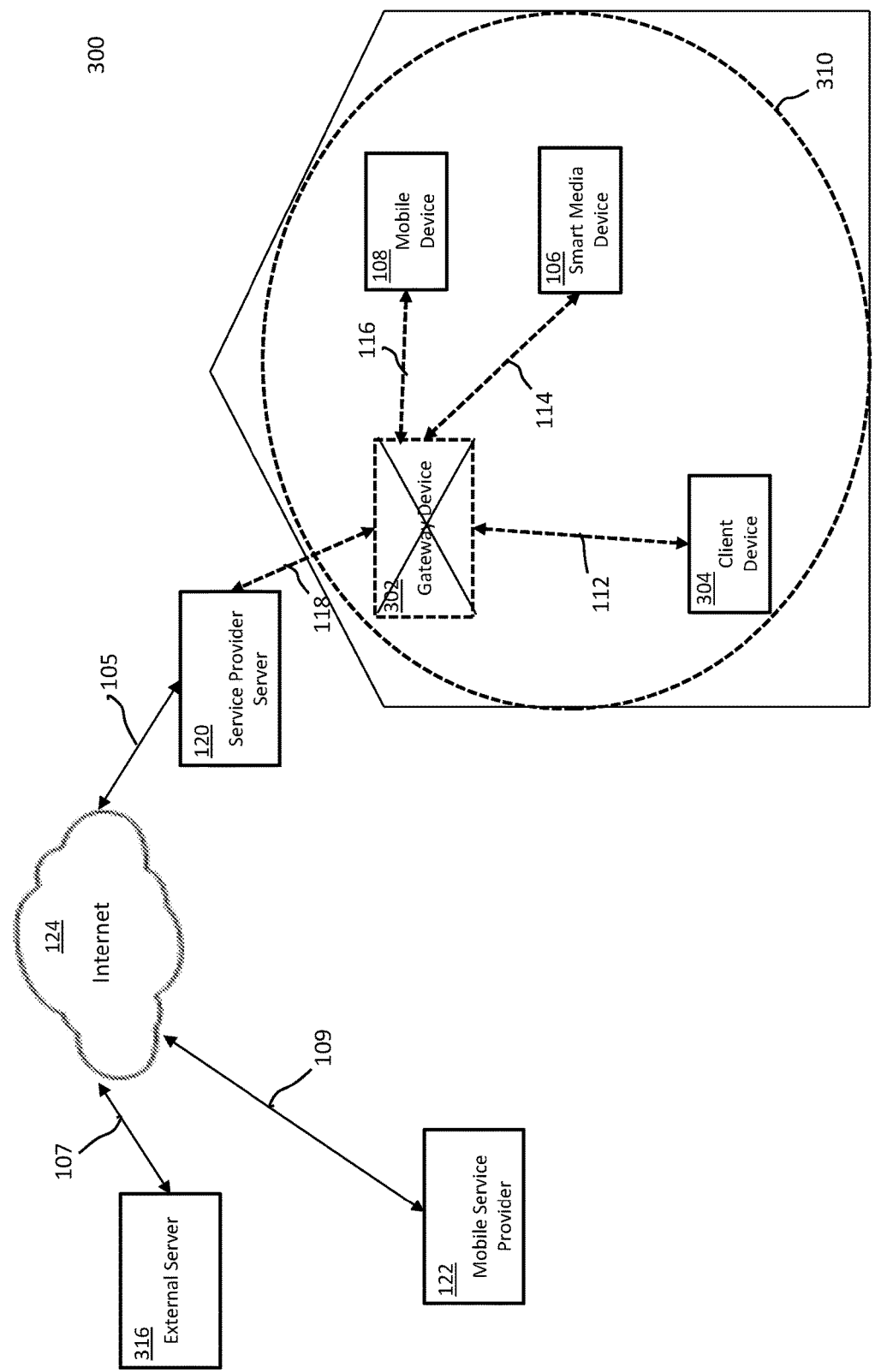
FIG. 3A illustrates an electronic communication network at a time $t_4$, in accordance with aspects of the present disclosure.

FIG. 3A illustrates an electronic communication network 300 at time $t_4$, in accordance with aspects of the present disclosure.

As shown in the figure, communication network 300 includes: a gateway device 302, a client device 304, smart media device 106, mobile device 108, a secure Wi-Fi network 310, service provider server 120, Internet 124, mobile service provider 122, and an external server 316. Client device 304 is configured to communicate with gateway device 302 via secure communication channel 330. Smart media device 106 is configured to communicate with gateway device 302 via secure communication channel 114. Mobile device 108 is configured to communicate with gateway device 302 via secure communication channel 116. Gateway device 302 is configured to communicate with service provider server 120 via physical media/wiring 118. Lastly, external server 316 is configured to communicate with Internet 124 via secure communication channel 107.

Gateway device 302, also referred to as a Wi-Fi APD, residential gateway, or RG, is an electronic device that is to be located so as to establish a local area network (LAN) at a user premises. The user premises may include a residential dwelling, office, or any other business space of a user. The terms home, office, and premises may be used synonymously herein.

Gateway device 302 may be any device or system that is operable to allow data to flow from one discrete network to another, which as will be described in greater detail below, will be from a wireless local area network (WLAN) to an external network, e.g., the Internet, which is shown as Internet 124. Gateway device 102 may perform such functions as web acceleration and HTTP compression, flow control, encryption, redundancy switchovers, traffic restriction policy enforcement, data compression, TCP performance enhancements (e.g., TCP performance enhancing proxies such as TCP spoofing), quality of service functions (e.g., classification, prioritization, differentiation, random early detection (RED), TCP/UDP flow control), bandwidth usage policing, dynamic load balancing, and routing.

As will be described in greater detail below, gateway device 302 establishes, or is part of WLAN 310, using Wi-Fi for example, such that client device 304, smart media device 106, and mobile device 108 are able to communicate wirelessly with gateway device 302.

For purposes of discussion, suppose that some time prior to time $t_4$, client device 304 has onboarded gateway device 302 and registered with external server 316. This may be performed in a manner similar to that discussed above with reference to FIG. 1A in which an SSO password is encrypted with an encryption key that was generated using unique identifiers from both gateway device 302 and client device 304. Client device 304 then stores the encrypted SSO password in external server 316. Still further, during this initial onboarding process, client device 304 registers gateway device 302 with external server 316. During registration, the identity of gateway device 302 is associated with an account of the user of client device 304. Further contact information such as an email address or phone number of the user of client device 304 and the encrypted SSO password is additionally associated with the account of the user of client device.

As shown in FIG. 3A, at some time after the initial onboarding of gateway device at time $t_4$, Wi-Fi network 310 has lost all connectivity due to gateway device 302 rebooting after a firmware upgrade which caused all configurations, including secure information for Wi-Fi network 310, to be wiped. This results in all client devices in Wi-Fi network 310 losing all connectivity. Client device 304, smart device 106 and mobile device 108 are no longer connected to gateway device 302, as indicated by dashed lines 112 and 114, respectively; and gateway device 302 is disconnected from service provider server 120, as indicated by dashed line 118. In order to re-establish Wi-Fi network 310, the user has to manually reconfigure gateway device 302 to connect to service provider server 120.

Figure 4:
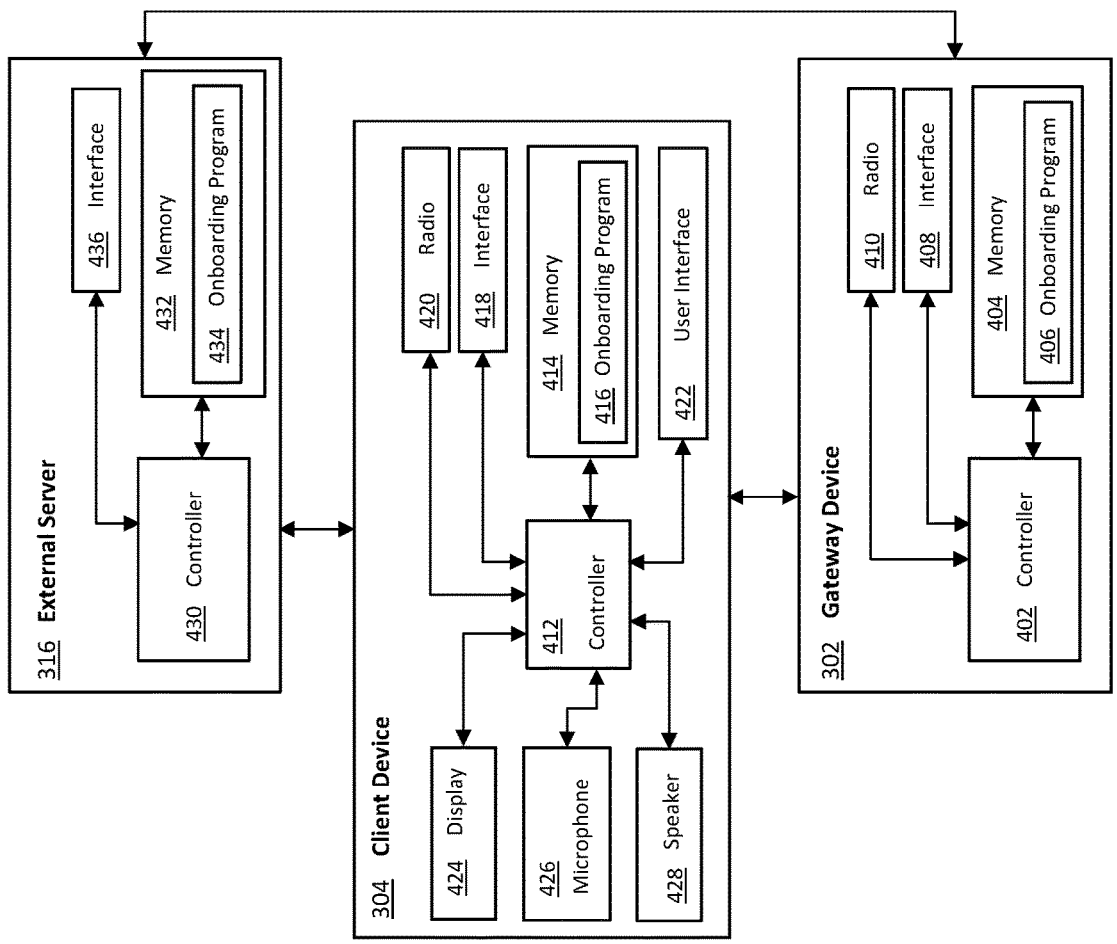
FIG. 4 illustrates an exploded view of the external server, the Wi-Fi APD, and the client device in the Wi-Fi communication network in FIG. 3A, in accordance with aspects of the current disclosure.

FIG. 4 illustrates an exploded view of client device 304, gateway device 302, and external server 316 of FIG. 3A.

As shown in FIG. 4, gateway device 302 includes: a controller 402, a memory 404, which has stored therein an onboarding program 406; at least one radio, a sample of which is illustrated as a radio 410, and an interface circuit 408.

In this example, controller 402, memory 404, radio 410, and interface circuit 408 are illustrated as individual devices. However, in some embodiments, at least two of controller 402, memory 404, radio 410 and interface circuit 408 may be combined as a unitary device. Whether as individual devices or as combined devices, controller 402, memory 404, radio 410, and interface circuit 408 may be implemented as any combination of an apparatus, a system and an integrated circuit. Further, in some embodiments, at least one of controller 402, memory 404, and interface circuit 408 may be implemented as a computer having a non-transitory computer-readable media for carrying or having computer-executable instructions or data structures stored thereon. Such non-transitory computer-readable recording medium refers to any computer program product, apparatus or device, such as a magnetic disk, optical disk, solid-state storage device, memory, programmable logic devices (PLDs), DRAM, RAM, ROM, EEPROM, CD-ROM or other optical disk storage, magnetic disk storage or other magnetic storage devices, or any other medium that can be used to carry or store desired computer-readable program code in the form of instructions or data structures and that can be accessed by a general-purpose or special-purpose computer, or a general-purpose or special-purpose processor. Disk or disc, as used herein, includes compact disc (CD), laser disc, optical disc, digital versatile disc (DVD), floppy disk and Blu-ray disc. Combinations of the above are also included within the scope of computer-readable media. For information transferred or provided over a network or another communications connection (either hardwired, wireless, or a combination of hardwired or wireless) to a computer, the computer may properly view the connection as a computer-readable medium. Thus, any such connection may be properly termed a computer-readable medium. Combinations of the above should also be included within the scope of computer-readable media.

Example tangible computer-readable media may be coupled to a processor such that the processor may read information from and write information to the tangible computer-readable media. In the alternative, the tangible computer-readable media may be integral to the processor. The processor and the tangible computer-readable media may reside in an integrated circuit (IC), an application specific integrated circuit (ASIC), or large-scale integrated circuit (LSI), system LSI, super LSI, or ultra LSI components that perform a part or all of the functions described herein. In the alternative, the processor and the tangible computer-readable media may reside as discrete components.

Example tangible computer-readable media may also be coupled to systems, non-limiting examples of which include a computer system/server, which is operational with numerous other general purpose or special purpose computing system environments or configurations. Examples of well-known computing systems, environments, and/or configurations that may be suitable for use with computer system/server include, but are not limited to, personal computer systems, server computer systems, thin clients, thick clients, handheld or laptop devices, multiprocessor systems, microprocessor-based systems, set-top boxes, programmable consumer electronics, network PCs, minicomputer systems, mainframe computer systems, and distributed cloud computing environments that include any of the above systems or devices, and the like.

Such a computer system/server may be described in the general context of computer system-executable instructions, such as program modules, being executed by a computer system. Generally, program modules may include routines, programs, objects, components, logic, data structures, and so on that perform particular tasks or implement particular abstract data types. Further, such a computer system/server may be practiced in distributed cloud computing environments where tasks are performed by remote processing devices that are linked through a communications network. In a distributed cloud computing environment, program modules maybe located in both local and remote computer system storage media including memory storage devices.

Components of an example computer system/server may include, but are not limited to, one or more processors or processing units, a system memory, and a bus that couples various system components including the system memory to the processor.

The bus represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

A program/utility, having a set (at least one) of program modules, may be stored in the memory by way of example, and not limitation, as well as an operating system, one or more application programs, other program modules, and program data. Each of the operating system, one or more application programs, other program modules, and program data or some combination thereof, may include an implementation of a networking environment. The program modules generally carry out the functions and/or methodologies of various embodiments of the application as described herein.

Controller 402 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of the gateway device 302 in accordance with the embodiments described in the present disclosure.

Memory 404 can store various programming, user content, and data including onboarding program 406. As will be described in greater detail below, onboarding program 406 includes instructions, that when executed by controller 402 enables gateway device 302 to be onboarded, or brought into a state of usability as a network device, by client device 304. Additionally, as will be described in greater detail below, onboarding program 406 also includes instructions, that when executed by controller 402 enables gateway device 302 to change the temporary password to the SSO password retrieved from external server 316.

Interface circuit 408 can include one or more connectors, such as RF connectors, or Ethernet connectors, and/or wireless communication circuitry, such as 5G circuitry and one or more antennas. Interface circuit 408 receives content from external server 316 (as shown in FIG. 3A) by known methods, non-limiting examples of which include terrestrial antenna, satellite dish, wired cable, DSL, optical fibers, or 5G as discussed above. Through interface circuit 408, gateway device 302 receives an input signal, including data and/or audio/video content, from external server 316 and can send data to external server 316.

Radio 410 (and preferably two or more radios), may also be referred to as a wireless communication circuit, such as a Wi-Fi WLAN interface radio transceiver and is operable to communicate with client device 304 and with external server 316. Radio 410 includes one or more antennas and communicates wirelessly via one or more of the 2.4 GHz band, the 5 GHz band, 6 GHz band, and the 60 GHz band, or at the appropriate band and bandwidth to implement the Wi-Fi 4, 5, 6, or 6E protocols. Gateway device 302 can also be equipped with a radio to implement a Bluetooth interface radio transceiver and antenna, which communicates wirelessly in the ISM band, from 2.400 to 2.485 GHz. As an alternative, at least one of the radios can be a radio meeting a Radio Frequency for Consumer Electronics (RF4CE) protocol, Zigbee protocol, and/or IEEE802.15.4 protocol, which also communicates in the ISM band.

External server 316 includes a controller 430, a memory 432, which has stored therein an onboarding program 434, and an interface circuit 436.

Controller 430 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of external server 316 in accordance with the embodiments described in the present disclosure.

Memory 432 can store various programming, user content, and data including onboarding program 434. Memory 432 includes a data structure, a non-limiting example of which includes a look up table that includes an entry for an account of the user of client device 304. The data structure additionally includes identifying information of gateway device 302 that associates gateway device 302 with the user of client device 304. This data structure additionally includes an entry for the account of the user of client device for an encrypted SSO password for use by client device 304. As will be described in more detail below, this data structure additionally includes space for entry of a temporary encrypted SSO password for temporary use by client device 304. As will be described in greater detail below, onboarding program 434 includes instructions, that when executed by controller 430 enables client device 304 to initiate onboarding of gateway device 302; and transmits the OTP and encrypted SSO password to client device 304 as requested by client device 304 during the onboarding of gateway device 302.

Client device 304 includes: a controller 412; a memory 414, which has stored therein an onboarding program 416; and at least one radio, a sample of which is illustrated as a radio 420; an interface circuit 418, a user interface circuit 422, a display 424, microphone 426, and a speaker 428.

In this example, controller 412, memory 414, radio 420, interface circuit 418, user interface circuit 422, display 424, and speaker 428 are illustrated as individual devices. However, in some embodiments, at least two of controller 412, memory 414, radio 420, interface circuit 418, user interface circuit 422, display 424, and speaker 428 may be combined as a unitary device. Further, in some embodiments, at least one of controller 412 and memory 414 may be implemented as a computer having tangible computer-readable media for carrying or having computer-executable instructions or data structures stored thereon.

As will be described in greater detail below, controller 412 is configured to execute instructions stored in memory 414 to cause client device 304 to transmit an OTP request to external server 316; obtain the OTP from external server 316; transmit the OTP to external server 316 to authenticate client device 304; transmit an encrypted SSO password request to external server 316; onboard gateway device 302 using a temporary password; receive the encrypted SSO password from external server 316; obtain the key from gateway device 302; decrypt the encrypted SSO password using the key to obtain the SSO password; and change the temporary password of gateway device 302 to the SSO password.

In some embodiments, as will be described in greater detail below, controller 412 is configured to execute instructions stored in memory 414 to additionally cause client device 304 to instruct gateway device 302 to perform a factory reset.

Controller 412 may be implemented as a hardware processor such as a microprocessor, a multi-core processor, a single core processor, a field programmable gate array (FPGA), a microcontroller, an application specific integrated circuit (ASIC), a digital signal processor (DSP), or other similar processing device capable of executing any type of instructions, algorithms, or software for controlling the operation and functions of client device 304 in accordance with the embodiments described in the present disclosure.

Memory 414 can store various programming, and user content, and data including onboarding program 416. As will be described in greater detail below, onboarding program 416 includes instructions, that when executed by controller 412 enables client device 304 to initiate onboarding onto gateway device 302.

Interface circuit 418 can include one or more connectors, such as RF connectors, or Ethernet connectors, and/or wireless communication circuitry, such as 5G circuitry and one or more antennas. Interface circuit 418 further enables controller 412 to decode communication signals received by radio 420 from gateway device 302 and to encode communication signals to be transmitted by radio 420 to gateway device 302.

User interface circuit 422 may be any device or system that is operable to enable a user to access and control controller 412 to manually operate or configure client device 304. User interface circuit 422 may include one or more layers including a human-machine interface (HMI) machines with physical input hardware such as keyboards, mice, game pads and output hardware such as computer monitors, speakers, and printers. Additional UI layers in user interface circuit 422 may interact with one or more human senses, including: tactile UI (touch), visual UI (sight), and auditory UI (sound).

Radio 420, may include a Wi-Fi WLAN interface radio transceiver that is operable to communicate with gateway device 302, as shown in FIGS. 3A-F and also may include a cellular transceiver operable to communicate with a mobile service provider 122 through a cellular network (not shown). Radio 420 includes one or more antennas and communicates wirelessly via one or more of the 2.4 GHz band, the 5 GHz band, 6 GHz band, and the 60 GHz band, or at the appropriate band and bandwidth to implement the Wi-Fi 4, 5, 6, or 6E protocols. Client device 304 can also be equipped with a radio to implement a Bluetooth interface radio transceiver and antenna, which communicates wirelessly in the ISM band, from 2.400 to 2.485 GHz. As an alternative, at least one of the radios can be a radio meeting a RF4CE protocol, Zigbee protocol, and/or IEEE802.15.4 protocol, which also communicates in the ISM band.

Insofar as gateway device 302 provides connection to service provider server 120, such as a multiple systems operator (MSO), gateway device 302 can be equipped with connectors to connect with a television or display device, and can also include programming to execute an electronic program guide and/or other suitable graphical user interface (GUI), and can with such configuration be referred to as a so-called set top box. Such a set top box can be included in the system shown in FIGS. 3A-F as gateway device 302 or in addition thereto. Moreover, inclusion of one or more of far-field microphones, (for e.g., voice command and/or presence recognition, and/or telephone communication), cameras, (for e.g., gesture and/or presence recognition, and/or video telephone communication), and speakers, and associated programming, can enable the gateway device to be a smart media device.

Returning to FIG. 2, after the gateway device has been rebooted (S216), it is determined whether or not instructions on the client device have also been reinstalled (S218). For example, as shown in FIG. 4, a user of client device 304 may user interface 422 to instruct controller 412 to reinstall onboarding program 416. In such a case, controller 412 will determine that instructions have been reinstalled.

If it is determined that the instructions on the client device have not been reinstalled (N at S218), then it is also determined whether the instructions have been installed on a second client device in the network (S220). For example, other client devices may include a controller that is configured to execute instructions stored on a memory in a manner similar to client device 304. As such, other client devices may install onboarding program 416 so as to be able to perform functions similar to client device 304. If these instructions are installed on another client device, then gateway device 302 will be informed when the other client device associates with gateway device 302. In such instances, gateway device 302 may inform client device 304 that another client device has installed onboarding program 416.

If it is determined that the instructions are not installed on any other device (N at S220), then method 200 stops (S234). In this situations, since the instructions have not been reinstalled on client device 304 and they have not been installed on any other client device, then it does not matter that gateway device 302 has been rebooted. Specifically, client device 304 will be able to re-onboard gateway device 302 and provide gateway device 302 with the previously created SSO.

However, if it is determined that the instructions have either been reinstalled on the client device (Y at S218) or the instructions have been installed on another client device (Y at S220), then the gateway device has to re-onboard (S222). This will be further discussed with reference to FIG. 3B.

Figure 3B:
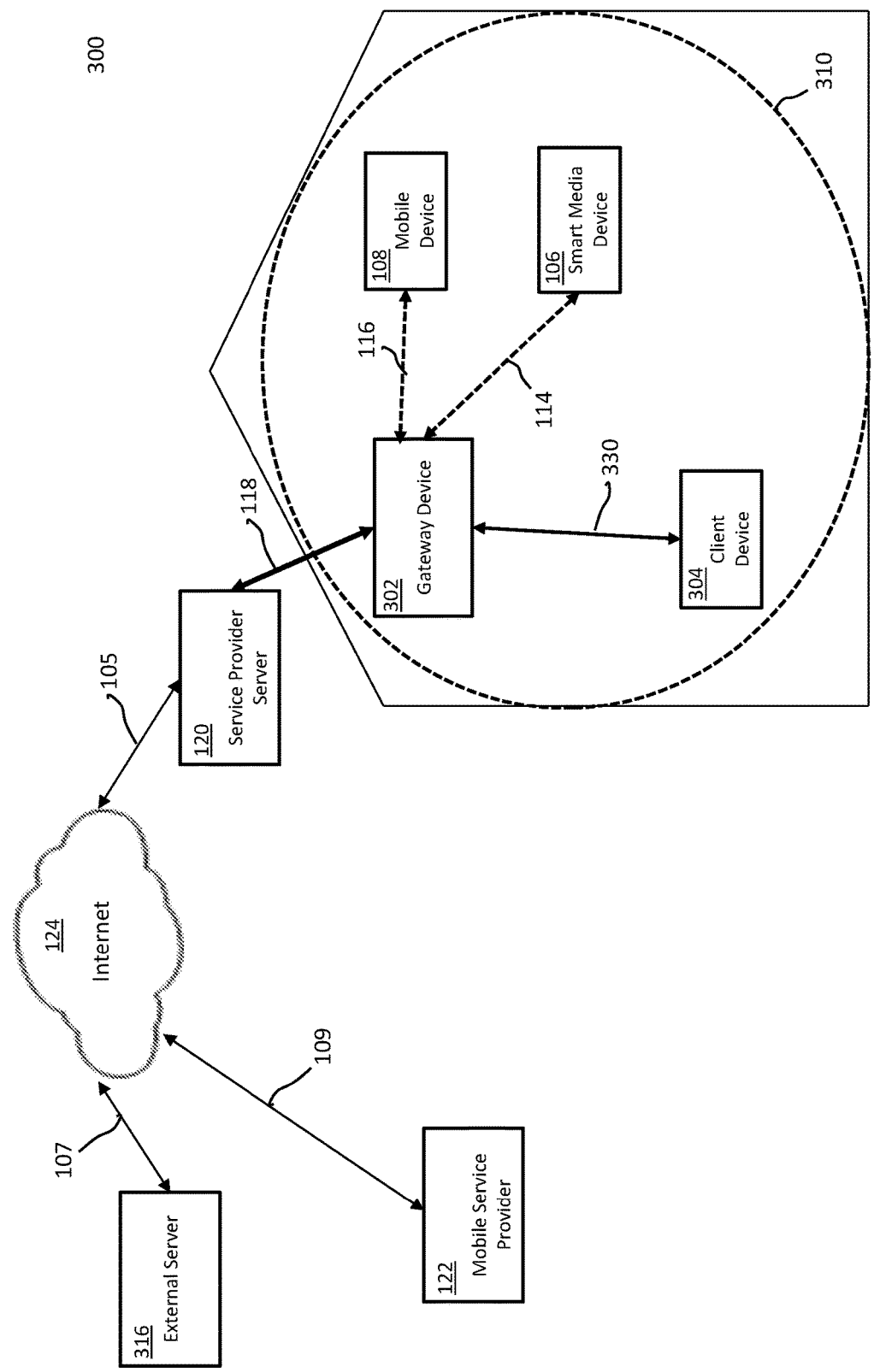
FIG. 3B illustrates the electronic communication network of FIG. 3A at a time $t_5$.

FIG. 3B illustrates the electronic communication network in FIG. 3A at time $t_5$.

As shown in the figure, at time $t_5$, gateway device 302 has been re-onboarded and is now able to connect to service provider server 120. Gateway device 302 is communicating with service provider server 120 through a secure communication link 320. Additionally, gateway device 302 is also able to communicate to Internet 124 via service provider server 120. Furthermore, gateway device 302 also connects to external server 316 by way of Internet 124 and service provider server 120 as well as to mobile service provider 122 by way of Internet 124 and service provider server 120. Client device 304 is also able to connect to service provider server 120 via gateway device 302. Additionally, client device 304 is able to connect to Internet 124 and external server 316 via gateway device 302 and service provider server 120. However smart media device 106 and mobile device 108 are still not able to connect to gateway device 302 since they only know the original Wi-Fi SSID initially configured prior to the firmware upgrade of gateway device 302.

Returning to FIG. 2, after the gateway device has re-onboarded (S222), the client device resets the SSO password used to register with the external server as a temporary SSO password (S224). This will be further discussed with reference to FIG. 3C.

Figure 3C:
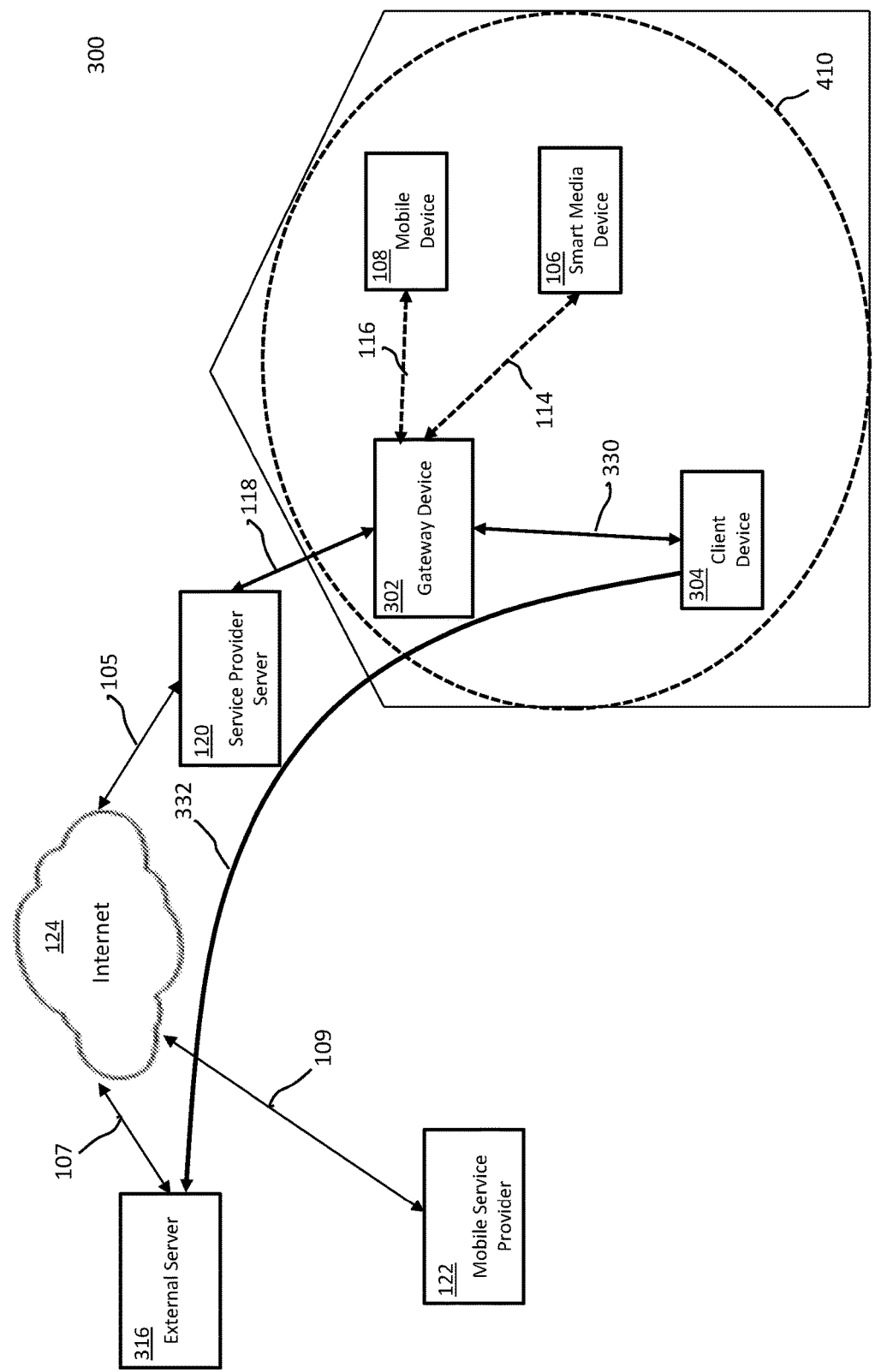
FIG. 3C illustrates the electronic communication network of FIG. 3A at a time $t_6$.

FIG. 3C illustrates the electronic communication network of FIG. 3A at time $t_6$.

As shown in FIG. 3C, after gateway device 302 has re-onboarded, at time $t_6$, client device 304 communicates with external server 316 via uplink communication channel 332 (via gateway device 302, service provider server 120, and Internet 124) to notify external server 316 that the SSO password that it used previously when re-onboarding gateway device 302 is a temporary password. Client device 304 also notifies external server 316 to retain the original SSO password it has initially set.

Returning to FIG. 2, after the client device has successfully reset the SSO password as a temporary password on the external server (S224), the client device retrieves the encrypted SSO password from the external server (S226). This will be further discussed with reference to FIG. 3D.

Figure 3D:
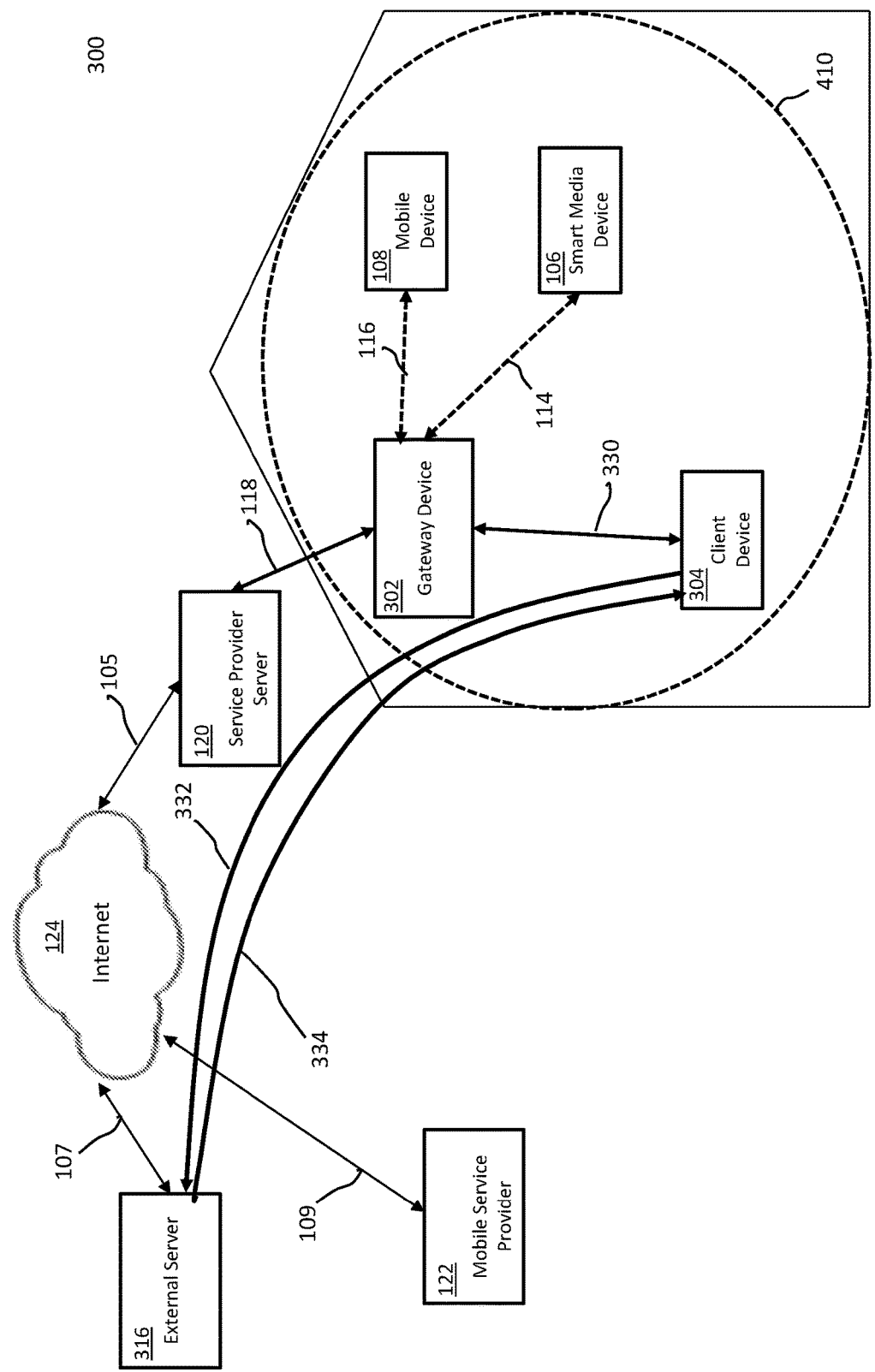
FIG. 3D illustrates the electronic communication network of FIG. 3A at a time $t_7$.

FIG. 3D illustrates the electronic communication network of FIG. 3A at time $t_7$.

As shown in the figure, at time $t_7$, after client device 304 has successfully re-onboarded gateway device 302, notified external server 316 that the SSO password it used to register gateway device 302 is only a temporary SSO password, and requested external server 316 to retain the original encrypted SSO password, client device 304 then retrieves the encrypted SSO password from external server 316 via downlink communication channel 334 (via Internet 124, service provider server 120, and gateway device 302). However, in order for client device 304 to retrieve the encrypted SSO password from external server 316, client device 304 must identify itself to external server 316.

As shown in FIG. 3D, the following authentication exchanges between client device 304 and external server 316 are over uplink communication channel 332 and downlink communication channel 334. To start the authentication process, client device 304 sends an OTP request to external server 316. Once it receives the OTP request via uplink communication channel 332, external server 316 sends back to client device 304 an OTP verification via downlink communication channel 334 so that client device 304 may authenticate itself. OTP verification may be provided to client device 304 by a manner indicated in memory 432 as shown in FIG. 4. For example, when gateway device 302 is initially registered and associated with client device 304, a user of client device 304 may provide contact information to external server 316. This contact information may then be used by controller 430 when executing instructions in onboarding program 434 to provide OTP verification via downlink communication channel 334. Non-limiting mechanisms to provide OTP verification via downlink communication channel 334 include: email, wherein an email address of the user of client device 304, which may have been provided by the user when initially registering gateway device 302, is used to send an email having an OTP for the user to access, or a phone call or text message, wherein a phone number of client device 304, which may have been provided by the user when initially registering gateway device 302, is used to send an automated voice message or text message having an OTP for the user to access. After client device 304 has received the OTP verification reply from external server 316, client device 304 then submits the OTP verification to external server 316 to authenticate itself.

After client device 304 has been successfully verified by external server 316, client device 304 sends a request for the encrypted SSO password stored in external server 316. External server 316, in turn, sends the encrypted SSO password to client device 304 via downlink communication channel 334.

Returning to FIG. 2, after the client device has retrieved the encrypted SSO password from the external server (S226), the client device also retrieves the key from the gateway device (S228). This will be further discussed with reference to FIG. 3E.

Figure 3E:
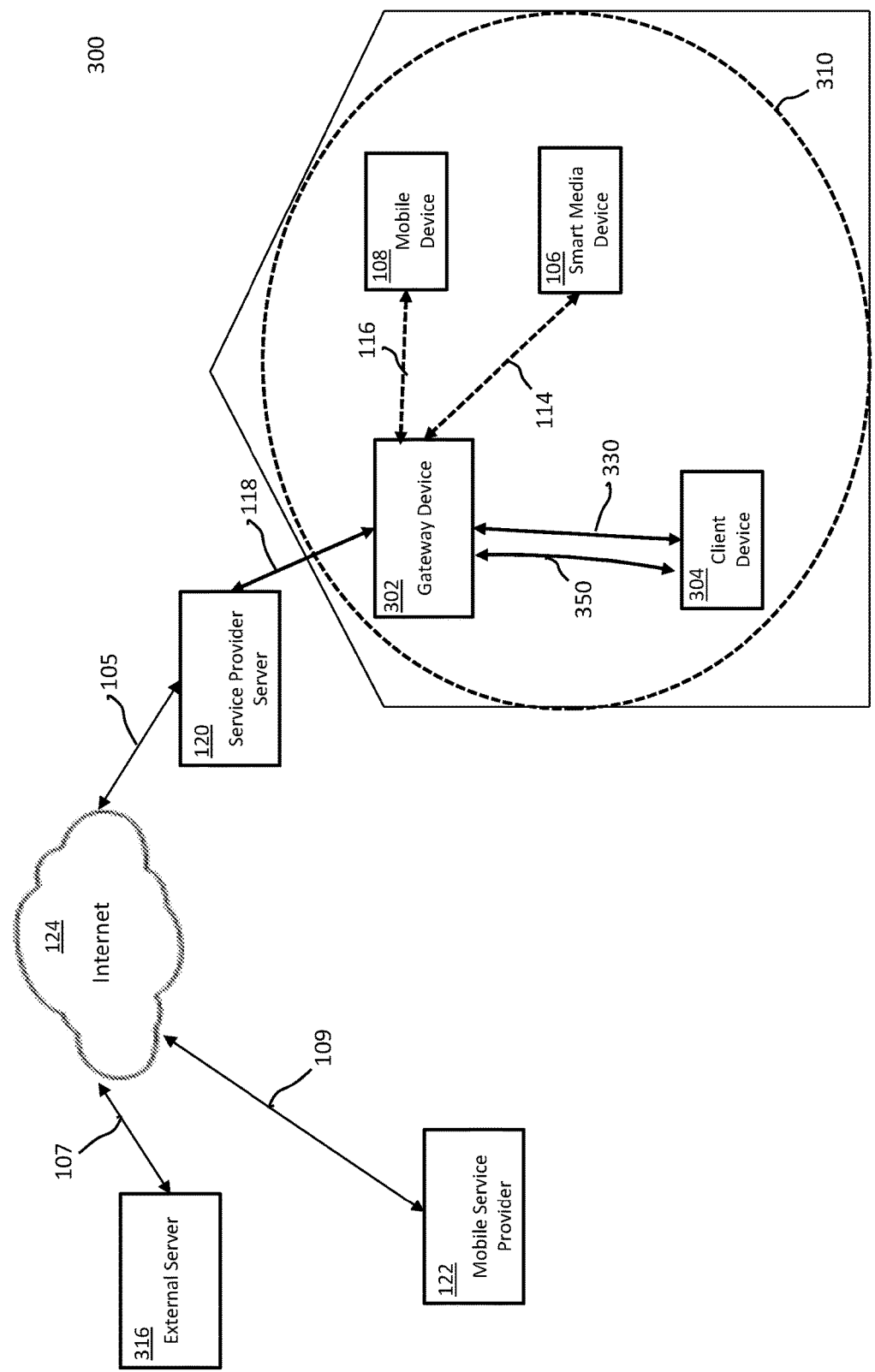
FIG. 3E illustrates the electronic communication network of FIG. 3A at a time $t_8$.

FIG. 3E illustrates the electronic communication network of FIG. 3A at time $t_8$.

As shown in FIG. 3E, at time $t_8$, client device 304 communicates with gateway device 302 via communication channel 330 and sends an instruction 350 to gateway device 302 to retrieve the key for decrypting the encrypted password received previously from external server 316.

Returning to FIG. 2, after the client device has obtained the key from the gateway device (S228), the client device uses the key to decrypt the encrypted SSO password (S230). For example, returning to FIG. 3E, after client device 304 has obtained the key from gateway device 302, client device 304 uses the key to decrypt the encrypted SSO password previously provided by external server 316.

Returning to FIG. 2, after the client device has decrypted the encrypted SSO password (S230), the client device instructs the gateway device to replace the temporary password with the decrypted SSO password (S232). For example, returning to FIG. 3E, after client device 304 successfully decrypts the encrypted SSO password received from external server 316 using the key provided by gateway device 302, client device 304 instructs gateway device 302 to replace the temporary password it had previously created for onboarding with the decrypted SSO password.

Returning to FIG. 2, after the gateway device has replaced the temporary password with the decrypted SSO password (S232), method 200 ends (S234). This will be further discussed with reference to FIG. 3F.

Figure 3F:
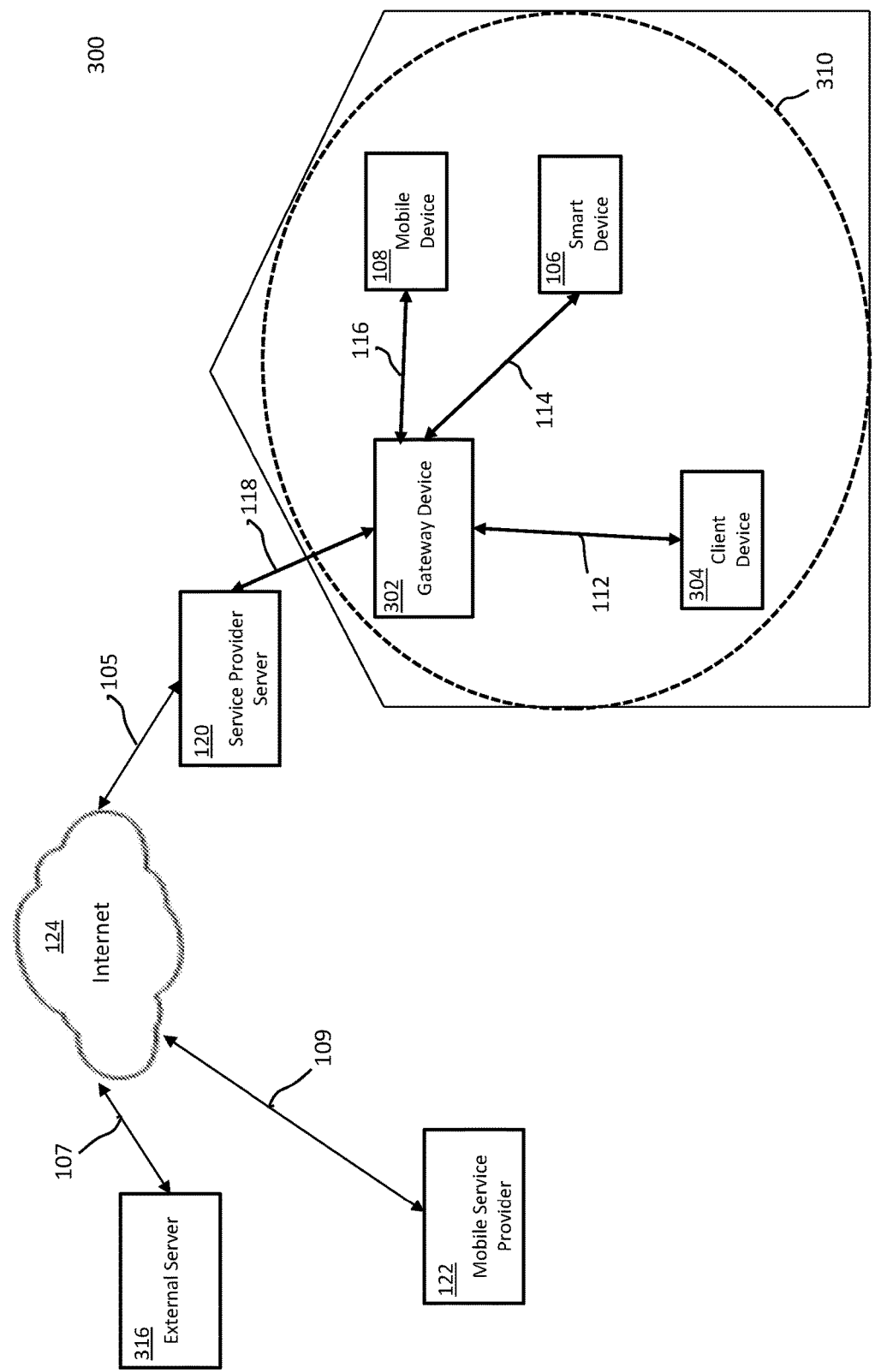
FIG. 3F illustrates the electronic communication network of FIG. 3A at a time $t_9$.

FIG. 3F illustrates the electronic communication network of FIG. 3A at time $t_9$.

As shown in FIG. 3F, at time $t_9$, after gateway device 302 replaced the temporary password with the original decrypted SSO password, a user can use the instructions installed on any of the client devices in the network to access and control gateway device 302. Client device 304 is now connected to gateway device 302 via secure communication link 112; smart media device 106 is connected to gateway device 302 via secure communication link 114; and mobile device 108 is connected to gateway device 302 via secure communication link 116.

In a conventional system where the network is configured to use a SSO password for all devices in the network to access and control the gateway device, when the gateway device goes down for some reason and loses its configuration including all secure information, and at the same time, if the user reinstalls the instructions to access the gateway device on a client device or installs the instructions on another client device, then the user will not be able to access and control the gateway device. In order to resync the SSO password to all devices in the network, the user must manually reconfigure and re-onboard all devices in the network, creating a new SSO password. The process to recover all devices in the network is extensive and cumbersome and also voids the original SSO password since it is no longer applicable with the new configurations.

In accordance with the present disclosure, a system and method is provided for seamlessly recovering the original SSO password stored on an external server and restoring it in the gateway device by way of a client device. In short, after the client device is able to authenticate itself with the external server, it can retrieve the encrypted SSO password from the external server; and along with a unique key provided by the gateway device, the client device can decrypt the encrypted SSO password. The client device can then re-onboard the gateway device and instruct the gateway device to replace the temporary password it used to re-onboard with the decrypted SSO password. This process provides a faster way to not only recover the gateway device to its original configuration with the original SSO password, but it also allows all clients in the network to reconnect to the gateway device using the same SSO password, hence, recovering the network seamlessly.

The operations disclosed herein may constitute algorithms that can be affected by software, applications (apps, or mobile apps), or computer programs. The software, applications, computer programs can be stored on a non-transitory computer-readable medium for causing a computer, such as the one or more processors, to execute the operations described herein and shown in the drawing figures.

The foregoing description of various preferred embodiments have been presented for purposes of illustration and description. It is not intended to be exhaustive or to limit the present disclosure to the precise forms disclosed, and obviously many modifications and variations are possible in light of the above teaching. The example embodiments, as described above, were chosen and described in order to best explain the principles of the present disclosure and its practical application to thereby enable others skilled in the art to best utilize the present disclosure in various embodiments and with various modifications as are suited to the particular use contemplated. It is intended that the scope of the present disclosure be defined by the claims appended hereto.

What is claimed is:

1. A client device for use with a Wi-Fi access point device (APD) and an external server, the Wi-Fi APD having a key stored therein, the external server having an encrypted single sign on (SSO) password associated with the Wi-Fi APD and with said client device stored therein, said client device comprising:
  a memory; and
  a processor configured to execute instructions stored on said memory to cause said client device to:
    transmit an OTP request to the external server;
    obtain the OTP from the external server;
    transmit the OTP to the external server to authenticate said client device;
    transmit an encrypted SSO password request to the external server;
    onboard the Wi-Fi APD using a temporary password;
    receive the encrypted SSO password from the external server;
    obtain the key from the Wi-Fi APD;
    decrypt the encrypted SSO password using the key to obtain the SSO password; and change the temporary password of the Wi-Fi APD to the SSO password.

2. The client device of claim 1, wherein said processor is configured to execute instructions stored on said memory to additionally cause said client device to instruct the Wi-Fi APD to perform a factory reset.

3. The client device of claim 1, wherein the key is based on unique information associated with the Wi-Fi APD.

4. The client device of claim 3, wherein the unique information includes a serial number of the Wi-Fi APD.

5. A method of using a client device with a Wi-Fi access point device (APD) and an external server, the Wi-Fi APD having a key stored therein, the external server having an encrypted single sign on (SSO) password associated with the Wi-Fi APD and with said client device stored therein, said method comprising:
  transmitting, via a processor configured to execute instructions stored on a memory, a OTP request to the external server;
  obtaining, via the processor, the OTP from the external server;
  transmitting, via the processor, the OTP to the external server to authenticate said client device;
  transmitting, via the processor, an SSO password request to the external server;
  receiving, via the processor, the encrypted SSO password from the external server;
  onboarding, via the processor, the Wi-Fi APD using a temporary password;
  obtaining, via the processor, the key from the Wi-Fi APD;
  decrypting, via the processor, the encrypted SSO password using the key to obtain the SSO password; and
  changing, via the processor, the temporary password of the Wi-Fi APD to the SSO password.

6. The method of claim 5, further comprising instructing, via the processor, the Wi-Fi APD to perform a factory reset.

7. The method of claim 5, wherein the key is based on unique information associated with the Wi-Fi APD.

8. The method of claim 7, wherein the unique information includes a serial number of the Wi-Fi APD.

9. A non-transitory, computer-readable media having computer-readable instructions stored thereon, the computer-readable instructions being capable of being read by a client device for use with a Wi-Fi access point device (APD) and an external server, the Wi-Fi APD having a key stored therein, the external server having an encrypted single sign on (SSO) password associated with the Wi-Fi APD and with said client device stored therein, wherein the computer-readable instructions are capable of instructing the client device to perform the method comprising:
  transmitting, via a processor configured to execute instructions stored on a memory, a OTP request to the external server;
  obtaining, via the processor, the OTP from the external server;
  transmitting, via the processor, the OTP to the external server to authenticate said client device;
  transmitting, via the processor, an SSO password request to the external server;
  receiving, via the processor, the encrypted SSO password from the external server;
  onboarding, via the processor, the Wi-Fi APD using a temporary password;
  obtaining, via the processor, the key from the Wi-Fi APD;
  decrypting, via the processor, the encrypted SSO password using the key to obtain the SSO password; and
  changing, via the processor, the temporary password of the Wi-Fi APD to the SSO password.

10. The non-transitory, computer-readable media of claim 9, wherein the computer-readable instructions are capable of instructing the client device to perform the method further comprising instructing, via the processor, the Wi-Fi APD to perform a factory reset.

11. The non-transitory, computer-readable media of claim 9, wherein the computer-readable instructions are capable of instructing the client device to perform the method wherein the key is based on unique information associated with the Wi-Fi APD.

12. The non-transitory, computer-readable media of claim 11, wherein the computer-readable instructions are capable of instructing the client device to perform the method wherein the unique information includes a serial number of the Wi-Fi APD.

* * * * *